April 26, 1932. H. J. TAUSCHER 1,855,428
VARIABLE SPEED TRANSMISSION MECHANISM
Filed March 24, 1930 4 Sheets-Sheet 1
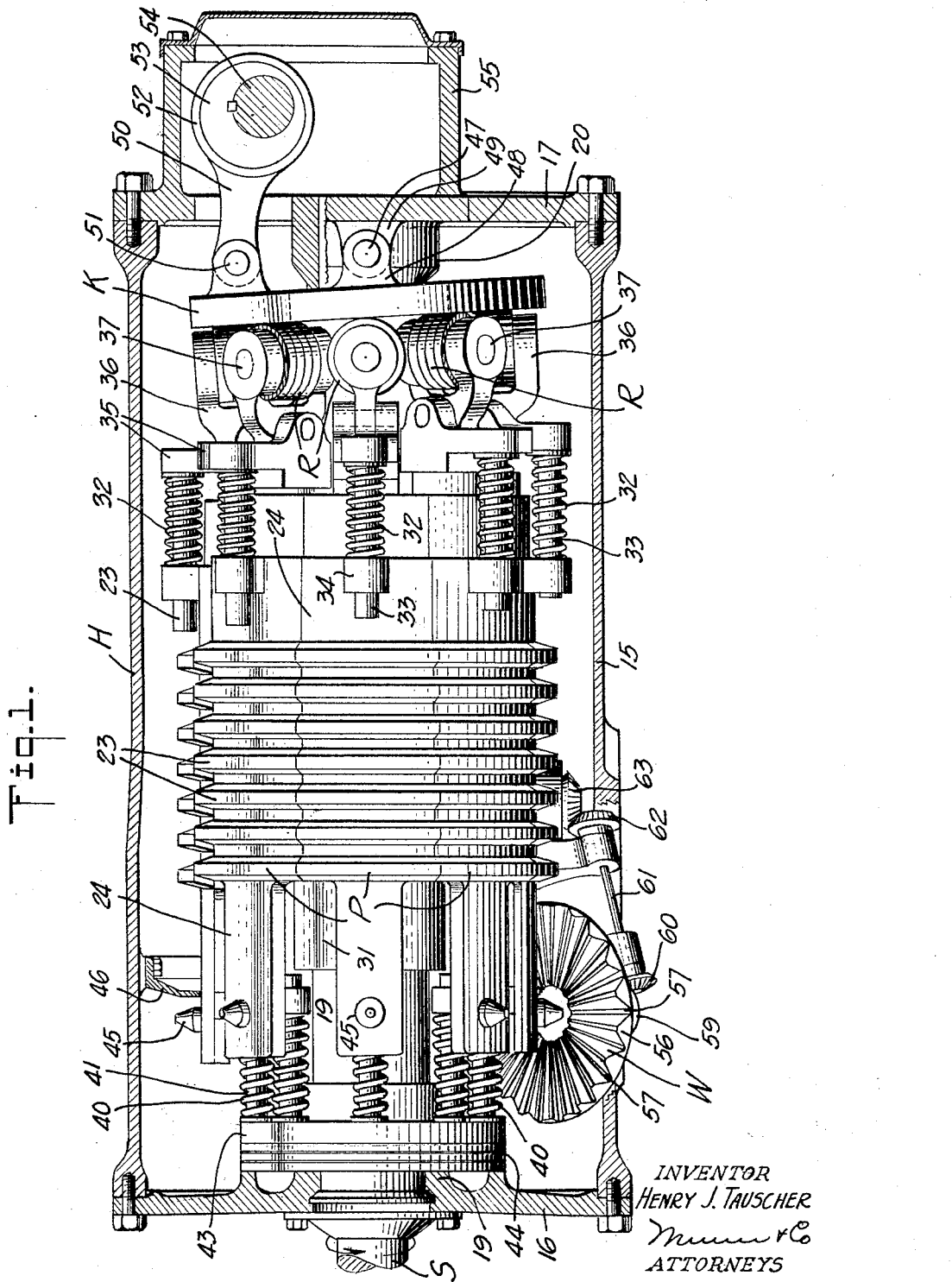
INVENTOR
HENRY J. TAUSCHER
ATTORNEYS

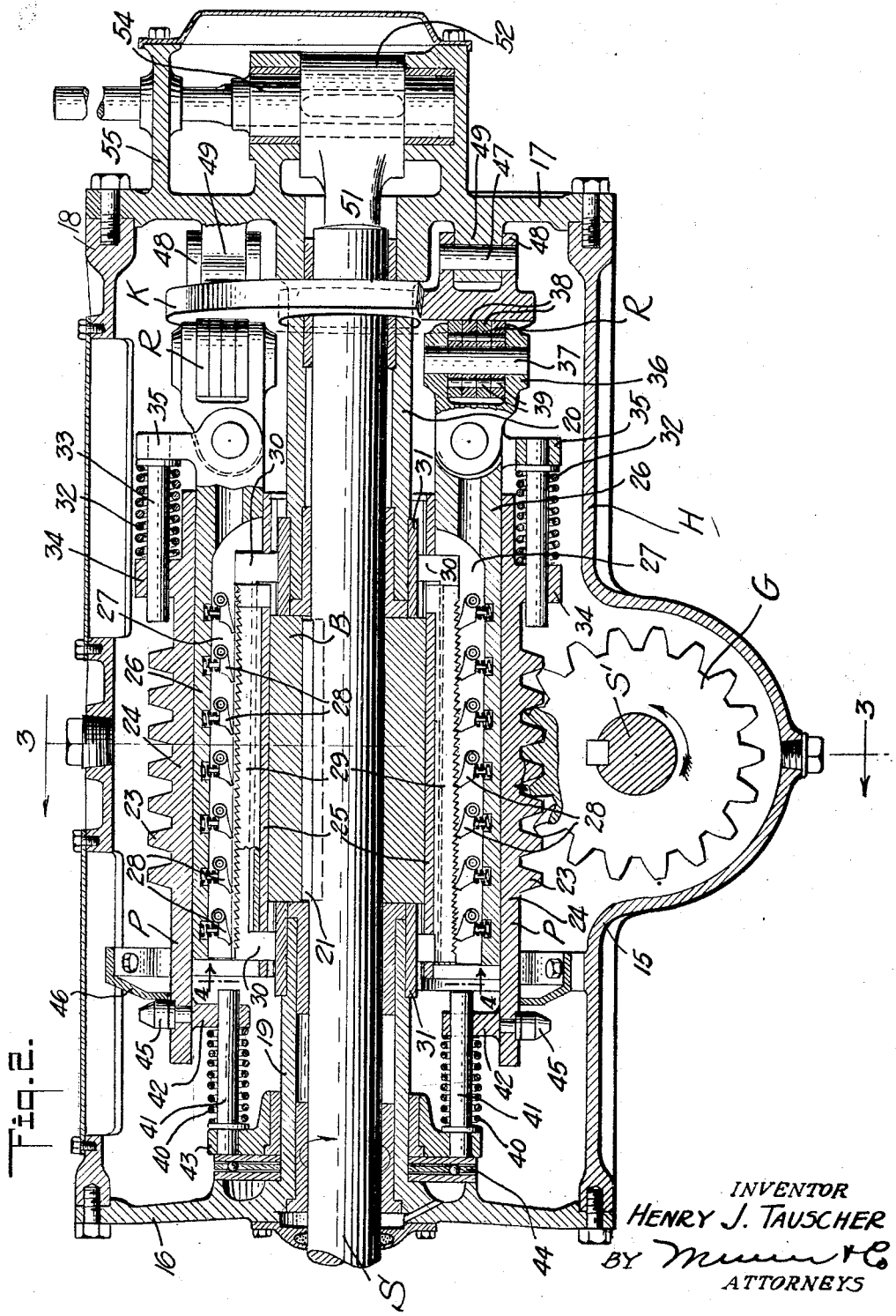

April 26, 1932.  H. J. TAUSCHER  1,855,428
VARIABLE SPEED TRANSMISSION MECHANISM
Filed March 24, 1930  4 Sheets-Sheet 3
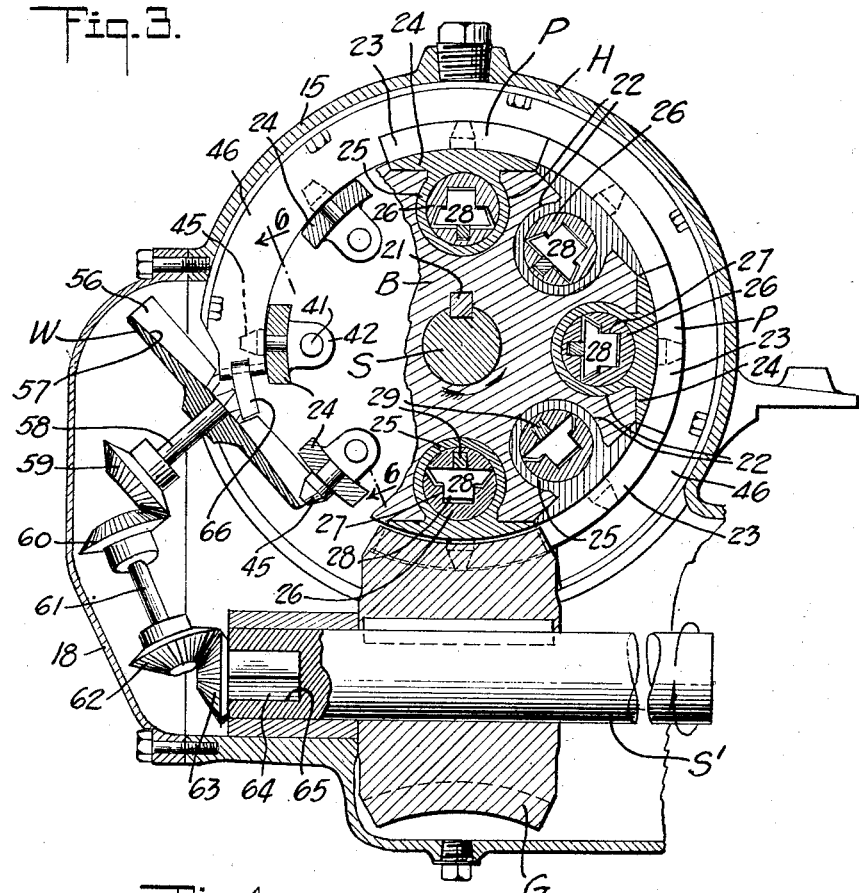
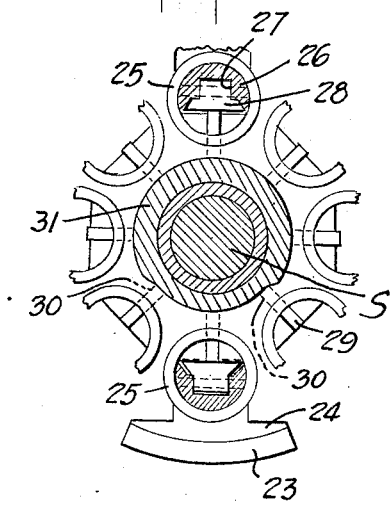
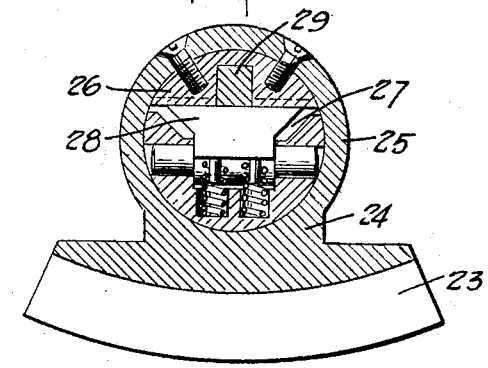
INVENTOR
HENRY J. TAUSCHER
BY
ATTORNEYS April 26, 1932.  H. I. TAUSCHER  1,855,428
VARIABLE SPEED TRANSMISSION MECHANISM
Filed March 24, 1930  4 Sheets-Sheet 4
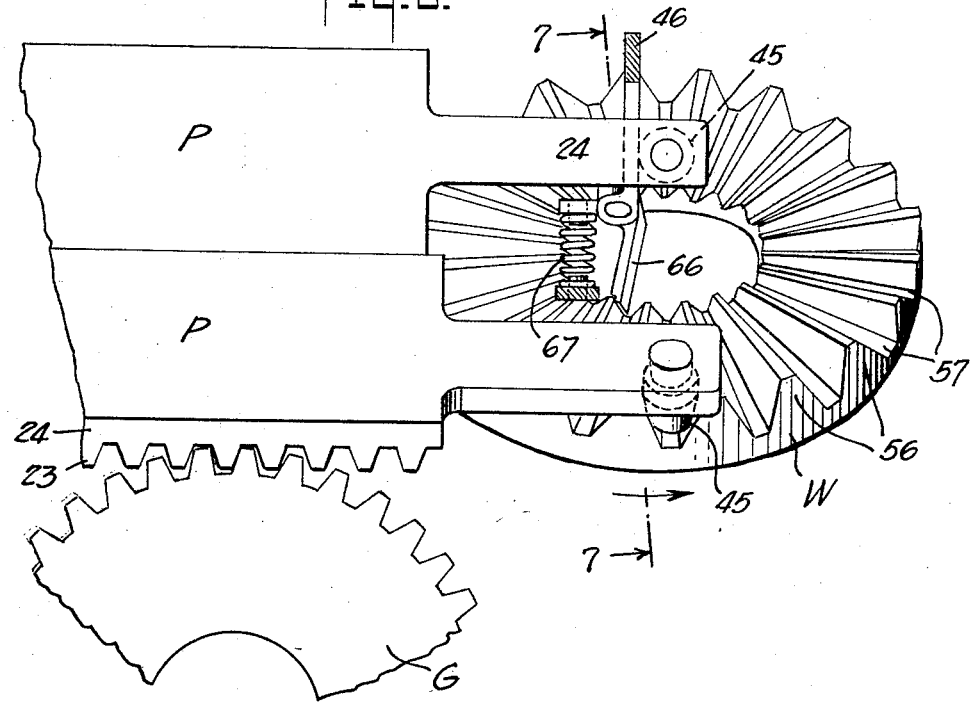
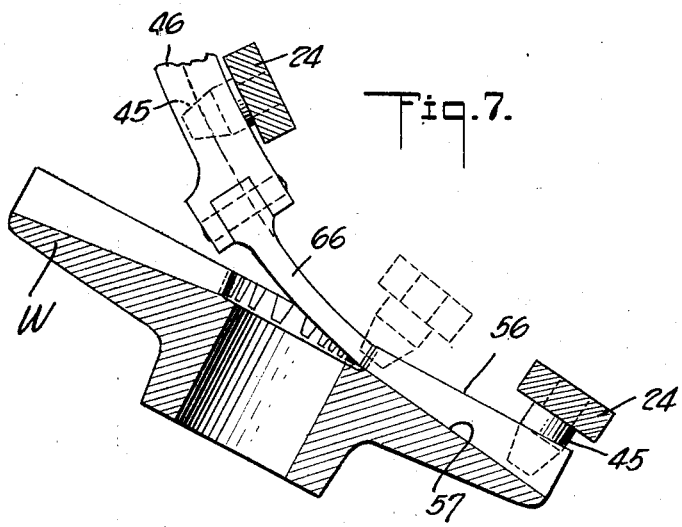
INVENTOR
HENRY J. TAUSCHER
BY
ATTORNEYS Patented Apr. 26, 1932

1,855,428

UNITED STATES PATENT OFFICE

HENRY J. TAUSCHER, OF LOS ANGELES, CALIFORNIA

VARIABLE SPEED TRANSMISSION MECHANISM

Application filed March 24, 1930. Serial No. 438,520.

My invention relates to variable speed transmission mechanisms, particularly adapted although not necessarily, for use in motor vehicles.

It is a purpose of my invention to provide a transmission mechanism which is characterized by its ability to transmit power from the driving shaft of a motor vehicle to the driven shaft thereof in any desired ratio to attain any desired driving speed and without the necessity of manual meshing and unmeshing of gears as is compulsory with the present type of selective speed transmission mechanism.

It is also a purpose of my invention to provide a transmission mechanism embodying a driving element and a driven element, and a plurality of members rotatable by the driving element so as to have successive and intermittent operative engagement with the driven element, and while in engagement with the driven element imparting a propelling impulse to the latter, these members being manually controlled in point of movement to vary the extent of the individual propelling impulses transmitted to the driven member, and whereby the driven element can be driven at any desired or required speed.

I will describe only one form of variable speed transmission mechanism embodying my invention, and will then point out the novel features thereof in claims.

In the accompanying drawings:

Fig. 1 is a view showing in top plan and partly in section one form of transmission mechanism embodying my invention.

Fig. 2 is a view showing the transmission mechanism in vertical longitudinal section.

Fig. 3 is a vertical transverse section taken on the line 3—3 of Fig. 2.

Fig. 4 is a fragmentary vertical sectional view taken on the line 4—4 of Fig. 2.

Fig. 5 is an enlarged detail section of one of the propelling elements embodied in the mechanism shown in the preceding views.

Fig. 6 is an enlarged fragmentary sectional view taken on the line 6—6 of Fig. 3.

Fig. 7 is a sectional view taken on the line 7—7 of Fig. 6.

Similar reference characters refer to similar parts in each of the several views.

My invention in its present embodiment comprises a housing designated generally at H and which includes a main body portion 15 closed at its ends by plates 16 and 17 and at one side by a third plate 18. As best shown in Fig. 2 the end plates 16 and 17 are provided with inwardly extending and elongated hubs 19 and 20, respectively, containing suitable bearings for a driving shaft S, the latter constituting an extension of an engine shaft or any other form of prime mover. Between the confronting ends of the hubs 19 and 20 is interposed a body B which is fixed to the shaft S for rotation therewith, by means of a key 21. As shown in Fig. 3, the body B is provided at its periphery with an annular series of pockets or grooves 22 extending lengthwise of the body and each containing a propelling unit P adapted to have operative engagement with a gear G keyed to a driven shaft S' suitably journaled in the housing H, and which shaft may constitute the rear axle of a motor vehicle, as will be understood.

The several propelling units P are identical in construction, and hence, a description of one will suffice for all. Each propelling unit comprises a rack 23 on a driven bar 24 to which latter is fixed a tube 25 slidable in the respective pocket or groove 22. It is to be noted that the tube 25 is of the same cross-sectional contour as the pocket in order that the tube cannot be thrown radially outward under rotative movement of the body B and yet the tube is free to be moved longitudinally within the pocket. Mounted for sliding movement within the tube 25 is a driving bar 26 having a groove 27 in which is contained a plurality of spring pressed pawls 28. A ratchet bar 29 is movable in the groove 27 to engage and disengage the pawls 28, and this ratchet bar is carried by the tube 25 with its ends formed with lugs 30 which are engaged by cams 31 fixed on the hubs 19 and 20 so that under rotation of the whole propelling unit, the ratchet bars are moved radially inward and outward to engage and disengage the pawls 28, and when in engagement with the latter setting up an operative connection between the driving bar and driven bar so that when the former is moved it will operate to drive the driven bar and thereby effect actuation of the rack 23 to rotate the gear G. The construction of the cams is identical, and the form of one of the cams is clearly illustrated in Fig. 4.

As when viewed in Figs. 1 and 2, the driving bar 26 is urged to the right by means of a spring 32 surrounding a pin 33 slidable in an ear 34 of the bar 24, and fixed in an ear 35 on the end of the driving bar 26. Under the action of this spring 32 the bar 26 is normally retained in a position in which a roller R contacts with the surface of a cam K, the roller being mounted in a bifurcated frame 36 pivoted as at 37 on the adjacent end of the driving bar 26. The roller R includes a plurality of rings 38 at the inner peripheries of which roller bearings 39 are disposed, there being one set of rollers for each ring and so that each ring is capable of rotation independently of the other rings for the purpose of permitting the roller as a whole to compensate for the differential movement imparted to the rings by reason of the radial disposition of the roller when in contact with one side of the cam K. As a consequence, the roller will roll freely on the surface of the cam and without appreciable friction and wear.

The driven bar 24 is likewise urged to the right, as when viewed in Fig. 2, by means of a spring 40 mounted on a pin 41 movable in an ear 42 fixed to the bar 24 and secured in a disk 43 rotatable on the hub 19 and spaced from the end plate 16 by means of a thrust bearing 44. Each bar 24 carries at its left hand end a roller 45 which normally abuts a ring 46 fixed to the inner side of the body 16 of the housing H, and in this manner the longitudinal position of all of the bars 24 under the action of the springs 40 is fixed and determined.

The cam K freely surrounds the hub 20 and is supported for pivotal movement in a manner to permit lateral adjustment thereof by means of the pins 47 mounted in ears 48 and extending through ears 49, the ears 48 and 49 being fixed to the cam K and the end plate 17, respectively. The vertical pivots thus formed are disposed at diametrically opposite points with respect to the cam in order that the cam can be swung about a central vertical pivot to dispose its inner face at various angles and for the purpose of controlling the extent or length of the propelling stroke of the driving bars 26. This cam K is capable of being adjusted manually by the provision of a link 50 pivotally connected to the cam at one side of the pivots 47 as indicated at 51. This link carries a ring 52 in which an eccentric 53 is rotatable, the latter being keyed to a shaft 54 journaled in suitable bearings in an extension 55 of the housing H. The shaft projects beyond the housing extension to any desired point to facilitate manual operation, as will be understood. By rotation of the shaft the eccentric 53 is actuated to move the link 50 longitudinally in either direction and to thereby swing the cam K about the pins 47 as a center.

For the purpose of insuring easy meshing of the teeth of the racks 23 with the teeth of the gear F as each propelling unit moves into operative relation to the gear, and irrespective of the circumferential position of the gear teeth, I provide the following mechanism:

This mechanism includes the rollers 45 which as illustrated are provided with frusto-conical noses. The mechanism also includes a guiding wheel W having one side thereof formed with ribs or teeth 56 spaced apart to provide intervening grooves 57. This wheel is fixed to a shaft 58 (Fig. 3) provided with a miter gear 59 which meshes with a similar gear 60 fixed to a shaft 61. The shaft 61 is similarly provided with a miter gear 62 which meshes with a like gear 63 fixed to a stub shaft 64 of angular cross section which is fitted within a suitable pocket 65 in the adjacent end of the driven shaft S′.

From this construction it will be seen that the wheel W is driven by the shaft S′ and at a speed corresponding to that of the latter in order to produce proper circumferential positioning of the ribs and grooves so that the latter may function to guide the rollers 45 in the paths intended. As illustrated to advantage in Fig. 3, the ring 46 is interrupted for a portion of its circumference in order to release the driven bars 24 and thus permit the latter to be subjected to the action of the guiding wheel to the end of effecting the proper longitudinal positioning of the racks 24 to insure meshing of their teeth with those of the gear G. At the upper end of the ring 46 a guiding finger 66 is pivotally mounted and normally urged into engagement with one of the ribs 56 by means of a spring 67. This finger is so positioned in respect to the adjacent end of the ring that as any one roller 45 passes off of the ring it moves on to the face of the finger and, under the guidance of the finger, the roller enters and traverses one of the grooves 57. As a result of this operation, the corresponding driven bar 24 is shifted longitudinally so that the teeth of the corresponding rack 23 are positioned to mesh with the teeth of the gear G. The driven bar is maintained in this position after the roller has passed out of the groove by means of the corresponding rack 29, as this rack is now moved outwardly to engage the pawls 28 under the action of the cams 31.

By pivotally mounting the guide finger and yieldably urging it into engagement with the ribs of the guiding wheels, it will be understood that, it does not interfere with rotation of the wheel but passes over the ribs. Yet it maintains a definite relation to each and every groove of the wheel so that as the rollers 45 of the several driven bars pass out of engagement with the ring 46 they are definitely guided by the finger into the grooves of the guiding wheel. In this manner each and every driven bar is properly positioned longitudinally so that the racks thereof have proper meshing relation to the gear G as they move into engagement therewith. Thus the possibility is prevented of the teeth of the rack striking the teeth of the gear and failing to mesh.

The operation of the transmission mechanism is as follows:

With the driving shaft S driven in a counterclockwise direction as when viewed in Fig. 3, the body B is set into rotation thereby imparting a corresponding movement to the several propelling units P. Under rotation of these units the rollers R are moved over the surface of the cam K, and by reason of the angular positioning of the cam K the driving bars 26 will be moved longitudinally to the left as when viewed in Fig. 2 and against the tension of the springs 32. The precise angular adjustment of the cam K determines the degree of movement of the driving bars and therefore it will be understood that through manual adjustment of the cam K the propelling strokes of the driving bars can be controlled and varied as desired. As the operation of each propelling unit P is the same a description of one will suffice for all.

Referring to Fig. 2, the rack 23 of the driving bar 24 of the lowermost propelling unit has just moved into mesh with the gear G, and the corresponding ratchet bar 29 has been cammed outwardly to engage the several pawls 28 to set up an operative connection between the driving bar 26 and the driven bar 24. Now, under rotative movement of the driving bar about the driving shaft as a center, the cam K functions to move the driving bar to the left, as when viewed in Fig. 2, carrying with it the driven bar 24. As a consequence, the rack 23, being in mesh with the gear, imparts a rotating impulse to the driven shaft S' in the direction of the arrow in Fig. 2. During this movement both springs 32 and 40 are compressed and thus placed under tension.

Following the afore-described propelling movement of the driven bar 24, under continued rotating movement of the bar it passes out of engagement with the gear G to allow the next propelling unit in the rear to engage the gear and perform its propelling action in respect to the shaft S'.

Once clear of the gear, the driven bar 24 is moved to the right under the expansive action of the spring 40, and until the corresponding roller 45 abuts the ring 46. Meanwhile, the driving bar is likewise moved to the right under the expansive action of the spring 32, it being understood that the cam K permits of such movement by reason of its angularly disposed face. The movement of the driving bar is independent of that of the driven bar for once the rack is clear of the gear the cams 31 move the ratchet bar clear of the pawls.

With the driven bar returned to the right as described, continued rotation of the body B causes the roller 45 to ride on the ring 46 until it reaches the interrupted portion of the ring whence the roller upon leaving the ring engages the guiding finger 66. From the finger 66 the roller is guided into one of the grooves of the guiding wheel, whence the driven bar and more particularly the rack thereof is properly positioned longitudinally to insure meshing of its teeth with those of the gear, and as will be understood from a consideration of Fig. 3, the driven bar is held in this position by the guiding wheel until the rack thereof actually moves into mesh with the gear. Once the rack moves into meshing relation to the gear the cycle of movement of the corresponding propelling unit is completed.

From the foregoing description of one propelling unit, it will be understood that in the operation of the mechanism the several propelling units operate successively and intermittently in respect to the gear G to effect propulsion of the driven shaft S', and that by an adjustment of the cam K the propelling strokes exerted by the units can be varied in point of length as desired.

Although I have herein shown and described only one form of variable speed transmission mechanism embodying my invention, it is to be understood that various changes and modifications may be made herein without departing from the spirit of the invention and the spirit and scope of the appended claims.

I claim:

1. A variable speed transmission mechanism comprising a driving element, a driven element, a plurality of members rotatable by the driving element, means for causing the members to have successive and intermittent operative engagement with the driven element during rotation thereof, stationary means and means on the members co-acting therewith to linearly move said members while in operative engagement with the driven element in a manner to propel the driven element, and means for adjusting the stationary means to vary the stroke of said members and to vary the speed at which the driven element is propelled.

2. A variable speed transmission mechanism comprising a driving element, a driven element, a plurality of members each mounted for reciprocating movement, means operatively connecting said members to the driving element so that the members are individually and operatively connected to the driven element, and means operable by the driving element for individually moving said members while in operative engagement with the driven element so as to effect driving of the latter, the last mentioned means being adjustable for varying the length of the stroke of each member and to thereby vary the speed at which the driven element is driven.

3. A variable speed transmission mechanism comprising a driving shaft, a driven shaft, a gear fixed to the driven shaft, a plurality of rack means for mounting the rack bars for rotation by the driving shaft so as to successively mesh with said gear and for permitting each bar to be moved lengthwise relative to the shaft and means for moving the rack bars lengthwise while in mesh with said gear so as to rotate the latter and thus propel the driven shaft.

4. A variable speed transmission mechanism comprising a driving shaft, a driven shaft, a gear fixed to the driven shaft, a circular arrangement of rack bars each capable of being moved to either of two extreme positions, means for operatively connecting the rack bars to the driving shaft so as to be rotated thereby and to thus intermittently and successively mesh with said gear, means for individually and yieldably urging the rack bars to one extreme position, and means for individually moving the rack bars to the other extreme position while in mesh with said gear whereby, intermittent rotation of the gear and propulsion of the driven shaft is effected.

5. A variable speed transmission mechanism comprising a driving shaft, a driven shaft, a gear fixed to the driven shaft, a circular arrangement of rack bars each capable of being moved to either of two extreme positions, means for operatively connecting the rack bars to the driving shaft so as to be rotated thereby and to thus intermittently and successively mesh with said gear, means for individually and yieldably urging the rack bars to one extreme position, means for individually moving the rack bars to the other extreme position while in mesh with said gear whereby, intermittent rotation of the gear and propulsion of the driven shaft is effected, and means by which the last means may be manually adjusted to vary the propelling stroke of the rack bars in a manner to vary the rotational speed of propulsion of the driven shaft.

6. A variable speed transmission mechanism comprising a driving shaft, a driven shaft, a gear fixed to the driven shaft, a plurality of rack bars each mounted for lengthwise movement to occupy either of two extreme positions, means tending to cause the rack bars to assume one extreme position, means for operatively connecting the rack bars to the driving shaft for rotation therewith and to successively mesh with said gear, actuating bars one for each of the rack bars, means for mounting the actuating bars for rotation by and with the driving shaft, means tending to cause the actuating bars to occupy one extreme position, means operable under rotation of the actuating bars to move the latter to another extreme position, and means acting to operatively connect the actuating bars with the rack bars only when the rack bars are in mesh with said gear so that when the actuating bars are moved to the other extreme position a corresponding movement is imparted to the rack bars to effect rotation of said gear.

7. A variable speed transmission mechanism as embodied in claim 6 wherein the means for moving the actuating bars to the other extreme position is adjustable to vary the length of movement of said bars and to thereby vary the length of movement of the rack bars to vary the degree of rotation of the gear by each rack bar.

8. A variable speed transmission mechanism comprising a driving shaft, a driven shaft, a gear fixed to the driven shaft, a plurality of rack bars correlated to the driving shaft for rotation therewith to successively and intermittently engage said gear and each bar mounted to move lengthwise in either direction and independently of the driving shaft, means for individually moving the rack bars in one direction while in engagement with the gear to rotate the latter, and means for individually moving the bars in the other direction while clear of the gear and to a position in which the teeth will mesh with those of the gear when the bar is rotated into engagement with the gear.

9. A variable speed transmission mechanism comprising a driving shaft, a driven shaft, a gear fixed to the driven shaft, an annular series of rack bars concentric of and rotatable with the driving shaft to successively and intermittently mesh with said gear, means operable by the driving shaft for individually moving the rack bars lengthwise in one direction and while in engagement with said gear to effect rotation of the driven shaft, and means for individually moving the rack bars in the other direction while out of mesh with said gear and to a position in which the teeth thereof mesh with the gear teeth as they are returned into engagement with said gear.

10. A variable speed transmission mechanism as embodied in claim 9 wherein said means for moving the rack bars in the other direction includes a toothed element driven by the driven shaft, and a projection on each of the rack bars engaging with the teeth of said element so that the corresponding rack bar will be moved by the element to return said bar to a position in which its teeth will mesh with the teeth of said gear when moved into engagement with the latter.

11. A variable speed transmission mechanism comprising a driving shaft, a driven shaft, a plurality of driven elements carried by and rotatable with the driving shaft to successively and intermittently engage the driven shaft, a plurality of driving elements carried by and rotatable with the driving shaft, there being one driving element for each driven element, means operable by the driving shaft for actuating the driving elements, and means for operatively connecting the driving elements to the driven elements only when the latter are in engagement with the driven shaft whereby, the driven elements operate to drive the driven shaft.

12. A variable speed transmission mechanism as embodied in claim 11 wherein the last means comprises pawl and ratchet mechanisms, the pawls being carried by the driven elements and the ratchets by the driving elements.

13. A variable speed transmission mechanism as embodied in claim 11 wherein the last means comprises pawl and ratchet mechanisms, the pawls being carried by the driven elements and the ratchets by the driving elements, and means operable by rotation of the driving shaft for moving the ratchets into engagement with the pawls only when the driven elements are in engagement with the driven shaft.

14. A variable speed transmission mechanism comprising a driving shaft, a driven shaft, a gear fixed to the driven shaft, a plurality of rack bars carried by and rotatable with the driving shaft to successively and intermittently mesh with said gear, driving bars carried by and rotatable with the driving shaft, pawls carried by the rack bars, ratchets carried by the driving bars and movable thereon to engage and disengage the pawls and when in engagement therewith setting up an operative connection between the driving bars and the rack bars, stationary cams engaging the ratchets for moving the latter into engagement with the pawls, stationary cams engaging the ratchets for moving the latter into engagement with the pawls, and adjustable means operable under rotation of the driving bars for driving the latter to effect driving of the rack bars.

15. A variable speed transmission mechanism comprising a driving shaft, a driven shaft, a gear fixed to the driven shaft, an annular series of rack bars concentric of and rotatable with the driving shaft to successively and intermittently mesh with said gear, means operable by the driving shaft for individually moving the rack bars lengthwise in one direction from a normal position and while in engagement with said gear to effect rotation of the driven shaft, means for returning the rack bars to normal position, and means for controlling the last means in such manner that the rack bars will be so positioned that their teeth can be moved into mesh with the teeth of said gear upon movement of the rack bars into engagement with the gear.

16. A variable speed transmission mechanism as embodied in claim 15 wherein the last means comprises a guide wheel having radially disposed tongues and grooves, projections on each of the rack bars, an interrupted ring against which said projections normally move, and a guiding finger associated with the ring and guide wheel for guiding the projections as they lead the ring into the grooves of said wheel.

17. A variable speed transmission mechanism as embodied in claim 15 wherein the last means comprises a guide wheel having radially disposed tongues and grooves, projections on each of the rack bars, an interrupted ring against which said projections normally move, a guiding finger associated with the ring and guide wheel for guiding the projections as they lead the ring into the grooves of said wheel, and means operable by the driven shaft for rotating the guide wheel at a predetermined speed.

18. A variable speed transmission mechanism comprising a driving shaft, a driven shaft, a gear fixed to the driven shaft, a body fixed to the driving shaft and provided with an annular series of circumferentially spaced grooves disposed in parallelism to said shaft, propelling units in said grooves, each unit comprising a bar movable lengthwise in the groove, a rack on the driven bar for intermittent engagement with the gear under rotative movement of the body, a driving bar movable in the driven bar, spring pressed pawls carried by the driving bar, a ratchet mounted for movement in the driven bar, stationary cams engageable with all of the ratchets of said units for moving the ratchets into and out of engagement with the pawls, said pawls when in engagement with the ratchets setting up operative connections between the driving and driven bars, a roller on the driving bar, an adjustable member engaging all of the rollers of the driving bars so that under rotative movement of the driving bars the latter will be moved longitudinally in one direction and to impart a corresponding driving movement to the driven bars when the racks of the latter are in mesh with said gear, means for urging the units in the direction of said member to cause the rollers to have engagement with said member, a roller on each of the driven bars, a stationary and interrupted ring against which the rollers of all of the driven bars are adapted to abut under the action of said urging means, a guide wheel driven by and at the same speed as the driven shaft, and having ribs thereon, and a guiding finger positioned at the interrupted portion of said ring to guide each roller onto the guide wheel so that each roller will engage a rib of the guide wheel and move the corresponding driven bar to a position in which its rack will mesh with the gear as it moves into engagement therewith.

HENRY J. TAUSCHER.